Figure 1:
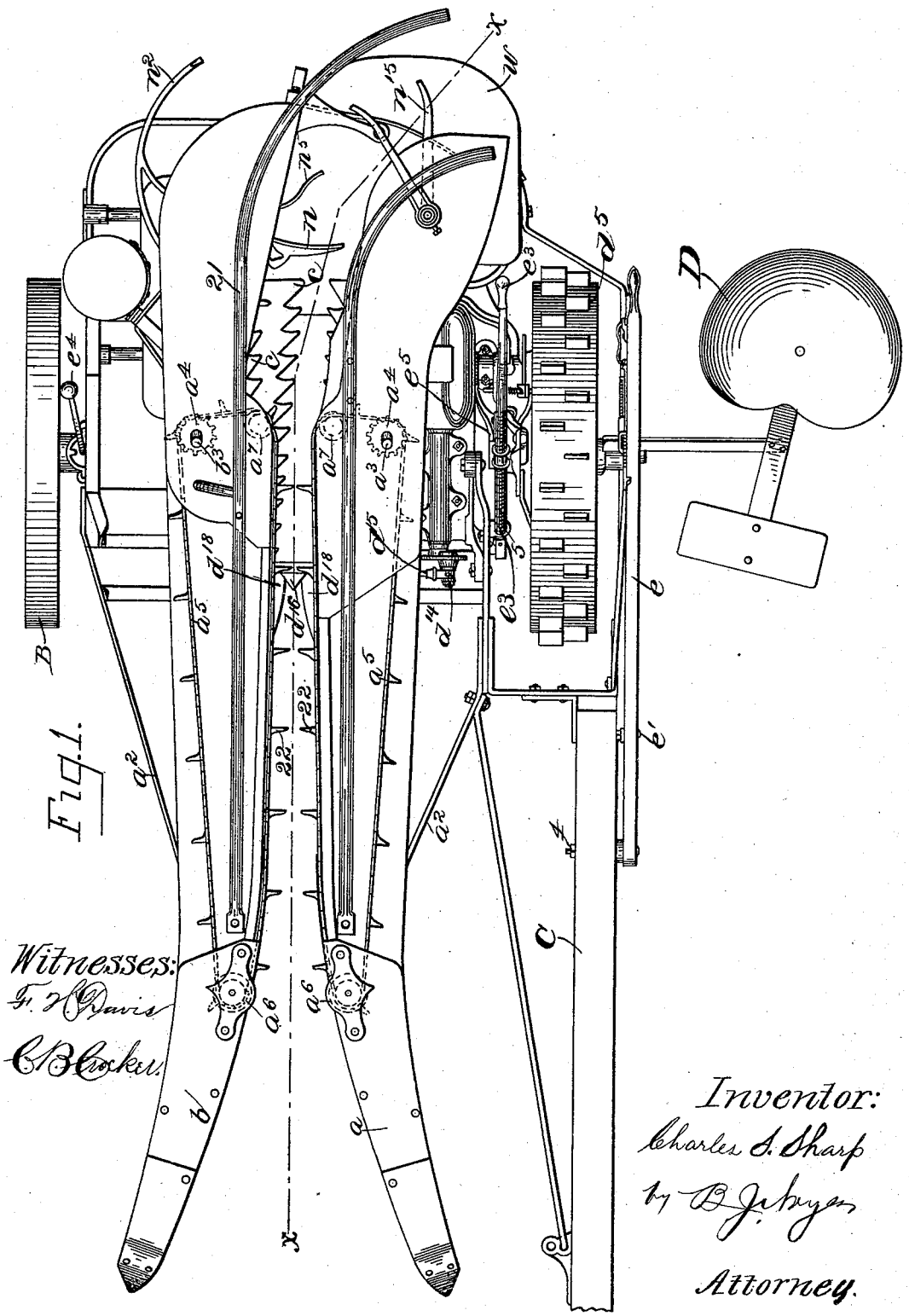

(No Model.) 4 Sheets—Sheet 1.

C. S. SHARP.
CORN HARVESTER.

No. 539,830. Patented May 28, 1895.

Witnesses:
F. H. Davis
C. B. Crocker

Inventor:
Charles S. Sharp
by B. Johnson
Attorney.

(No Model.) 4 Sheets—Sheet 3.
C. S. SHARP.
CORN HARVESTER.

No. 539,830. Patented May 28, 1895.

Witnesses:
Florence H. Davis
Charles B. Cocker

Inventor:
Charles S. Sharp
by R. J. Noyes
Attorney.

(No Model.) 4 Sheets—Sheet 4.
C. S. SHARP.
CORN HARVESTER.
No. 539,830. Patented May 28, 1895.
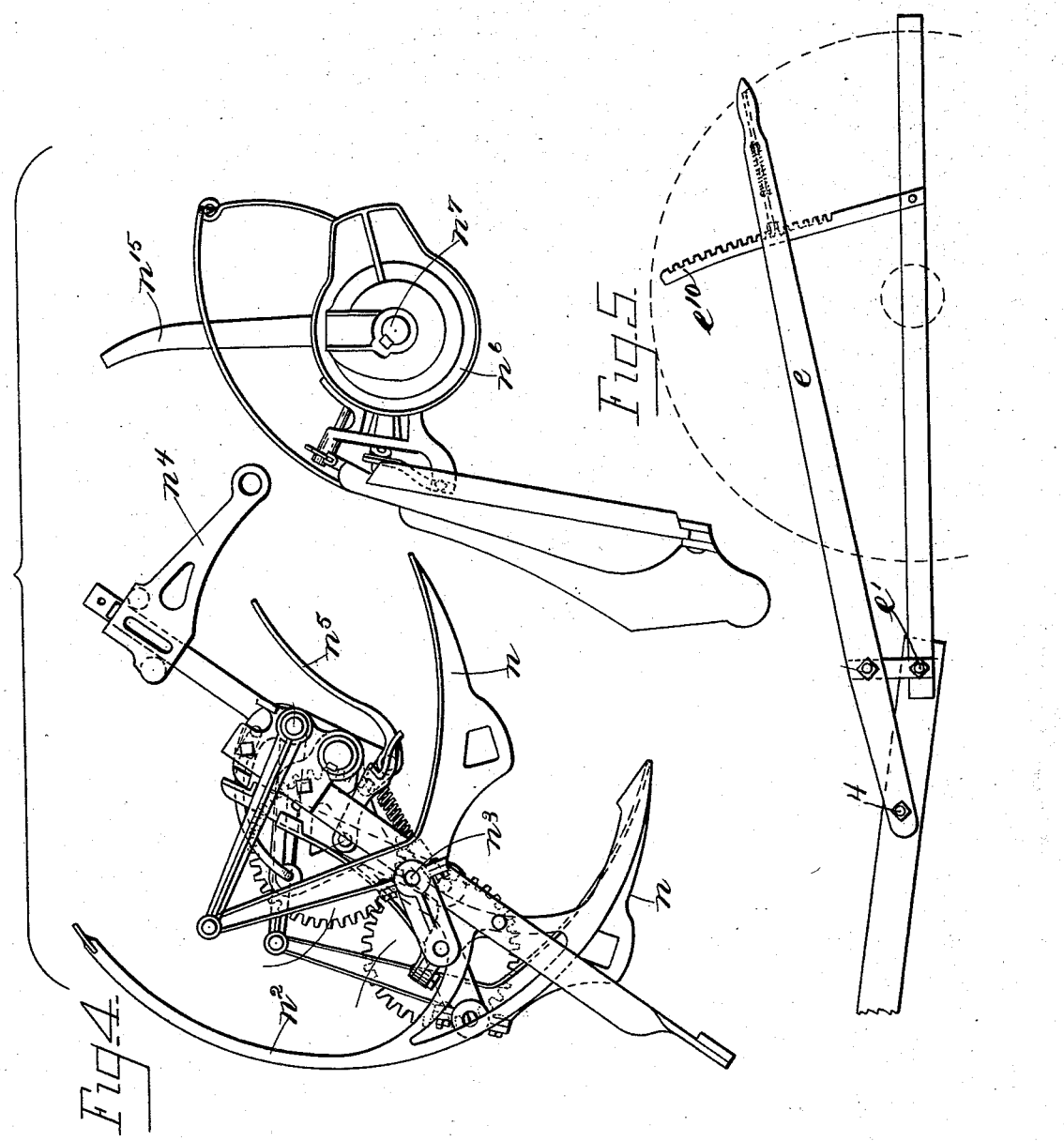
Witnesses:
Inventor:
Charles S. Sharp
by B. J. Hayes
Attorney

UNITED STATES PATENT OFFICE.

CHARLES S. SHARP, OF AUBURN, NEW YORK, ASSIGNOR TO THE D. M. OSBORNE & COMPANY, OF SAME PLACE.

CORN-HARVESTER.

SPECIFICATION forming part of Letters Patent No. 539,830, dated May 28, 1895.

Application filed November 15, 1894. Serial No. 528,888. (No model.)

*To all whom it may concern:*

Be it known that I, CHARLES S. SHARP, of Auburn, county of Cayuga, State of New York, have invented an Improvement in Corn-Harvesters, of which the following description, in connection with the accompanying drawings, is a specification, like letters and figures on the drawings representing like parts.

This invention relates to corn harvesters, and consists of the various improvements hereinafter described and specifically pointed out in the claims.

In carrying out this invention I employ suitable gathering devices, which may be made as a pair of arms designed to stride a row of corn, cutting mechanism by means of which the corn is cut, feeding mechanism for feeding along the severed corn "in standing position," a vertical binder to which the corn is delivered "on end" which is constructed and arranged to form and bind the bundles "on end," and thereafter discharge them. The feeding mechanism conveys the severed corn rearwardly to the vertical binder, gradually elevating it in its passage, and depositing it on the floor of the binder, which is supported in a plane above the cutting devices.

I have found in practice that in order to practically convey the corn to the vertical binder "in standing position," two feeding devices are necessary, one acting upon the stalks, and the other upon the stubble or butt ends, being arranged one above the other.

The upper or stalk feeding device, which when two feeding devices are employed forms a co-operative part of the corn feeding or conveying mechanism, preferably moves at a greater rate of speeed than the lower or butt feeding device, and comes in contact with the corn in advance of the lower feeding device, and when harvesting a level field the parts are located and timed to tip the top of the severed corn a little backward as it is conveyed along to the binder, delivering the corn "on end" upon the binder platform, which at such time occupies a horizontal plane; but in many cases the field is uneven, sloping here and there; and hence I have provided an adjusting device which is constructed and arranged to tilt the machine, or so adjust its parts that the binder platform can always be made to occupy substantially a horizontal plane, and also that the relative time that the two feeding devices contact with or engage the corn may be maintained, so as to prevent the corn tipping forward or tipping too far rearward as it is fed along to the binder and bundled.

The upper or stalk feeding device is herein shown as operating continuously, while the lower or butt feeding device is constructed and arranged to act intermittingly upon the corn, yet feed it forward substantially continuously and in order that this form of feeding device may be effective, two or more pairs of feeding jaws are employed, so arranged with relation to each other, and so operated upon, that they act successively to grip and feed along the corn. A continuous upper or stalk-feeding device holds the leaves in compact form as the corn is fed along. Butt feeding devices, which move thus positively toward the corn, and after feeding it along a short distance, and then positively away from the corn, permit the weeds, grass, &c., to pass freely along with the corn, instead of choking the machine, or winding them into the feeding mechanism, which has been a serious defect in previous forms of feeding mechanism employed in corn harvesting machines and furthermore such feeding devices are not rapidly worn out as are chain feeding devices which have been previously employed.

Figure 2:
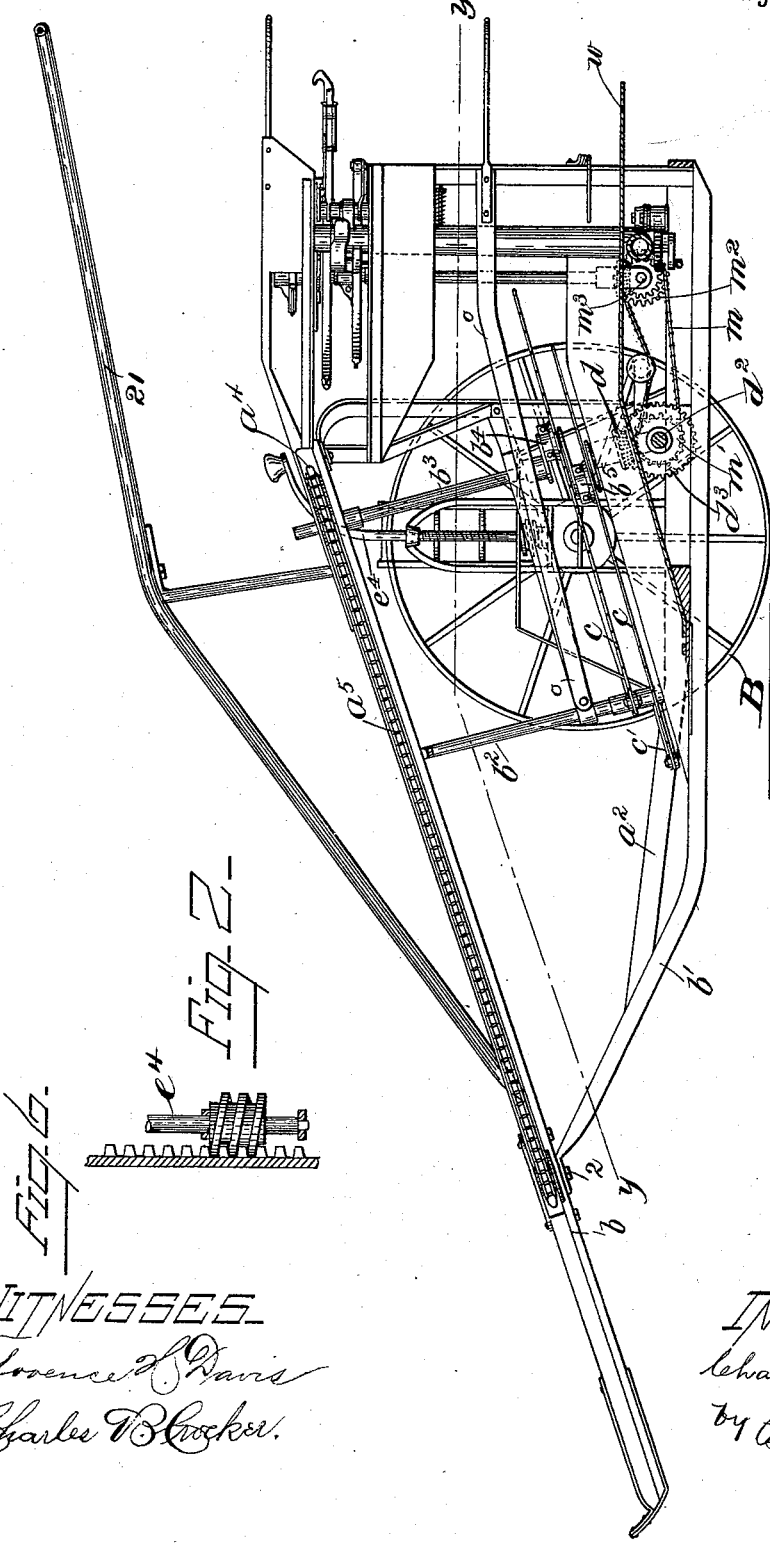
Figure 3:
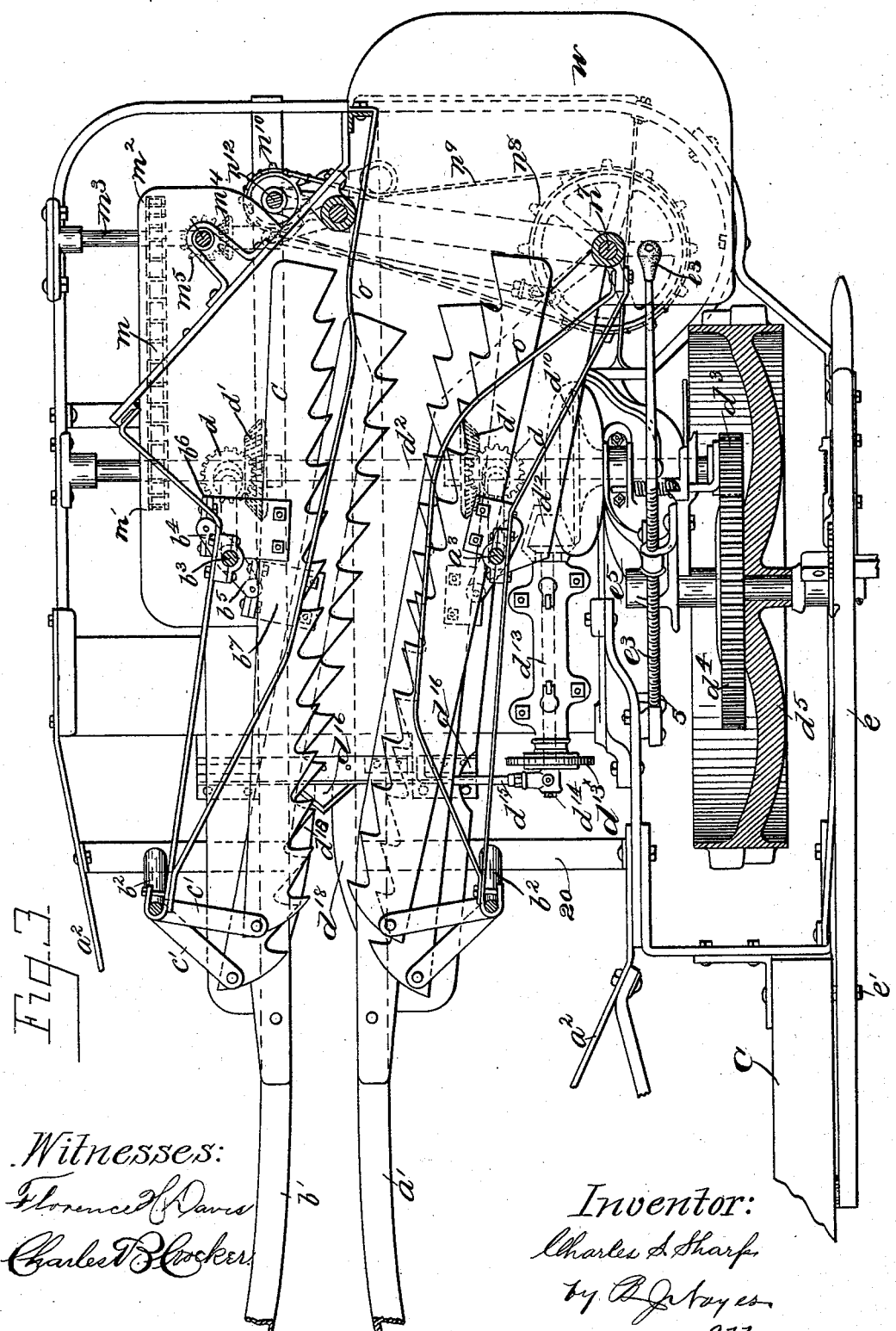

Figure 1 shows in plan view a corn-harvesting machine embodying this invention; Fig. 2, a longitudinal vertical section of the machine, taken on the dotted lines $x\ x$; Fig. 3, a horizontal section of the machine shown in Fig. 2, taken on the dotted line $y\ y$; Fig. 4, a plan view of the vertical binder attachment; Fig. 5, a side view of the tilting lever, and Fig. 6 a detail of the vertical adjustment for the frame at the grain-wheel side of the machine.

A pair of gathering arms or guides are arranged at the forward end of the machine, consisting of upper inclined portions $a, b$, and lower base portions $a', b'$, said parts being rigidly secured together at their forward ends, as by bolts 2, and also rigidly secured to the framework, and suitably braced and supported, and said arms are located a short distance apart, diverging more or less, particularly at their forward ends, presenting a converging passageway between them for the corn to be harvested, through which the corn is conveyed rearward in standing position. These arms congregate the stalks, and their forward ends are brought quite near the ground so as to pick up any stalks that may have fallen. As braces for the component parts of said arms there may be inclined vertical props or posts $b^2$ connecting the upper portions $a$, $b$, with a cross bar 20 of the frame-work, and also substantially horizontal bars $a^2$ connected at their forward ends to the lower portions $a'$, $b'$ of the gathering arms, and at their rear ends to the frame-work, or said bars $a^2$ may extend rearwardly and be considered as a part of the frame-work.

Mounted on top of each gathering arm, and secured thereto is an inclined guard rail 21 for the tall corn, said rails being supported in any desirable elevated position, and the rear ends of said guard rails are curved or bent in a direction at substantially right angles, which is in the direction I prefer to discharge or deliver the bundle.

At or near the rear end of each gathering arm or guide, is an oblique shaft $a^3$, $b^3$. These shafts bear at their upper ends sprocket wheels $a^4$, over or around which pass endless sprocket chains $a^5$, said chains occupying a plane parallel with the upper parts $a$, $b$, or substantially so, and extending forward around idle wheels $a^6$ journaled in the forward ends of the arms. These inclined sprocket chains $a^5$, $a^5$, also pass around idlers $a^7$ journaled in the arms, opposite the sprocket wheels $a^4$, so that continuous acting portions of the chain may travel in the passageway, between the arms, and by reason of suitable projections 22 on the chain will engage the stalks of the corn, and feed it rearward.

Near the lower end of each oblique shaft $a^3$, $b^3$, a double crank $b^4$, $b^5$, is formed, the wrists of which are embraced by bearings on the ends of plates $b^6$, $b^7$, rigidly secured to jaws $c$, represented as plates and arranged one above the other, in parallel planes. The forward ends of said plates $c$ are loosely connected by links $c'$ with the props or posts $b^2$ or other fixed parts.

As the oblique shafts $a^3$, $b^3$ are rotated, first one pair of plates will be brought into engagement with the butts of the corn, being then moved rearwardly a short distance carrying the corn along its passageway, and then receding, and disengaging the corn just as the other or next pair is brought into engagement with the corn. The plates thereby move or reciprocate longitudinally, although having what is called a four-motion movement, i. e., they move toward each other to grip or engage the butts of the corn, then rearwardly to feed the corn along its passageway, then recede from each other to disengage the corn, and return to the starting point.

As many pairs of jaws or plates $c$ may be employed as desired, and as they act alternately and successively upon the corn, the latter is fed along continuously or substantially so.

The plates $c$ are toothed or serrated along their adjacent edges, and the points of the teeth are directed toward the line of feed, to better engage and feed the corn along in standing position.

In ordinary corn fields, weeds grow quite luxuriantly, and when the corn is harvested a good many of the weeds are entangled or entwined with the butts of the corn, and so are fed along into the machine with the corn. This has always been a serious source of trouble in previous attempts to harvest corn by machinery for the weeds are drawn out by the endless feeding chains, which have heretofore been used for feeding along the butts of corn, and become entangled or wound around the operating parts of the machine, and especially around the chains themselves, the revolving sprocket wheels, and their shafts, thus clogging the machine and making it necessary for the driver at intervals to stop the machine, get down from his seat, and cut or tear away the weeds from the operating parts of the machine.

I have found that by the use of reciprocating feed plates, or feeding devices which are brought intermittently and successively into engagement with the butts of the corn, I can obviate all the trouble heretofore caused by the weeds, for as a result of my new form of feeding device the weeds are fed freely along with the butts of the corn and passed out through the machine without any clogging or entanglement either with the feeding devices or the other operative parts of the machine. Furthermore by providing a plurality of pairs of feeding jaws or plates acting successively to grip and feed along the corn, in conjunction with the endless chains, said corn can be fed along continuously, although the co-operating parts of the butt feeding mechanism are intermittingly operated or made to reciprocate.

The endless chains $a^5$, $a^5$, serve as the stalk feeding devices, engaging the stalks some distance above the ground, and the reciprocating jaws or plates act upon the lower or butt ends of the stalks, and serve as the butt feeding devices.

The upper or chain feeding device projects forward considerably in advance of the lower or butt feeding device, and therefore first comes in contact with the stalks of corn, and then the butt feeding devices take hold just before the corn is severed, so that the corn will be firmly held at such time.

The upper or stalk feeding device is arranged to move at a greater rate of speed than the lower or butt feeding device, so as to feed along the top of the corn a little faster than the butts, thereby tipping it slightly rearwardly. This is done for the purpose of preventing the corn tipping forward, which greatly impedes the progress of the corn along its passageway, and presents it to the binder in such a way that it is difficult to form the bundle.

At the lower ends of the oblique shafts $a^3$, $b^3$, bevel gears $d$ are secured, which are engaged by bevel gears $d'$ secured to the horizontal main shaft $d^2$, bearing at one end a pinion $d^3$ which is engaged by the toothed gear $d^4$ secured to the drive or ground wheel $d^5$, or to its shaft. A bevel gear $d^{10}$, see dotted lines, Fig. 3, is also secured to the main shaft $d^2$ which engages and drives a bevel gear $d^{12}$ secured to a short longitudinal shaft $d^{13}$, having at its forward end a crank $d^{13\times}$, to the crank pin $d^{14}$ of which one end of a pitman $d^{15}$ is connected, the other end of said pitman being connected with the cutter bar $d^{16}$.

The cutter bar is arranged to reciprocate across the passageway between the gathering arms, near the ground, and by means of the mechanism described is reciprocated longitudinally as the machine advances.

The cutter bar $d^{16}$ is herein represented as having a single cutting tooth, working between and in conjunction with two side cutting blades $d^{18}$, $d^{18}$.

The binder is of the kind in common use in grain binding machines and is known as the Appleby type, and as its specific construction forms no part of this invention, it will be only generally described. It is arranged vertically, so that its several parts work in substantially horizontal planes. It consists of the packers $n$, $n$, double cranked packer operating shaft, needle $n^2$, its shaft $n^3$, compressor $n^4$, trip lever $n^5$, knotter operating wheel $n^6$, its shaft $n^7$, sprocket wheel $n^8$ thereon, sprocket chain $n^9$, sprocket wheel $n^{10}$ on shaft $n^{12}$ carrying a pinion which engages a pinion on the packer operating shaft, discharge arm $n^{15}$ on the knotter shaft, binder platform $w$ which receives the corn "on end," and other necessary elements which in themselves form no part of my present invention.

The binder attachment is driven by means of a sprocket chain $m$ passing around a sprocket wheel $m'$ on the main driving shaft, and also around a sprocket wheel $m^2$ on the shaft $m^3$ which carries a bevel gear $m^4$ engaging a bevel gear on the packer operating shaft.

The platform of the binder is necessarily supported in a plane above the cutting devices, owing to the driving mechanism of the binder being located beneath the platform, and hence the feeding mechanisms, both upper and lower, are arranged to not only feed the corn rearward, but also upward, to deposit it "in standing position" on the binder platform.

To guide the corn to the binder, and to assist in keeping its lower ends from becoming entangled with the operating mechanism I have provided two bars $o$, $o$, extending from end to end of the feeding devices, and just above them.

The passage through the binder is herein shown as in a direction toward the seat, or to one side of the machine, so that the bundles will be discharged or delivered to one side.

The seat D is supported at one side of the machine, and the pole C connected to the frame in any desirable way.

When the machine is working on level ground the parts are so disposed and adjusted as to properly engage the corn and feed it along to the binder, tipping it slightly rearward in its passage; but when harvesting on a side hill, or slope, the relative positions of the parts are changed, unless some means are provided for maintaining their original position. As for instance in going downhill, the difference in time between which the front ends of the upper and lower feeding devices come in contact with the corn is decreased, owing to the different angles with relation to the ground that the corn is growing, it always growing substantially perpendicular, regardless of the slope of the ground, and in going uphill these relative times of contact are reversed. As a result in going downhill the corn tips forward, notwithstanding the greater speed of the upper feeding device, and in going uphill it tips too far rearward. Therefore I have provided means whereby the same relative times that the front ends of the upper and lower feeding devices come in contact with the corn may be maintained regardless of the slope; also when harvesting on the level the binder platform is substantially horizontal, but when going up or down hill it is canted, and as a result the bundle tips forward, or too far rearward, as the case may be, and so also I have provided means for maintaining the binder platform level regardless of the slope. One way of carrying out this part of my invention consists in pivoting the main frame-work upon the main shaft $b^2$, so that it may be rocked or tilted thereon. A single hand lever $e$ is herein shown as the tilting lever its extreme forward end being connected by a bolt 4, or otherwise, to the pole, and the two together pivoted at $e'$ to the frame, and the upper end of the lever $e$ has a slotted block or strap which moves up and down a toothed quadrant or sector, a spring controlled dog being provided for engaging one or another tooth of said quadrant. By moving this tilting lever the front ends of the upper and lower feeding devices are moved with relation to the ground so that the relative times that they come in contact with the perpendicular corn is maintained, and so also the binder platform is moved so as to remain level, or substantially in its original position.

While I have found it to be very convenient to tilt all the parts on a common axis, as shown, by means of a single tilting lever, and that the desired results are thereby obtained, I do not, however, desire to limit my invention to thus simultaneously tilting both ends of the machine, as it is obvious that my invention is broader in scope than mere construction by which it is carried out; and as I am the first to employ two feeding devices, one above the other, provided with an adjustment whereby the relative times that they come in contact with the corn may be maintained, and also the first to provide a substantially horizontal binder platform with an adjustment whereby it may remain level regardless of the slope of the ground, I desire to broadly claim these features, whether the adjustment is obtained by pivoting the supporting-frame for the parts, or otherwise.

Means are also provided for adjusting the gathering arms, feeding devices and binder attachment vertically, which as herein represented consists of two screw rods $e^3$, $e^4$, the screw rod $e^3$ passing through an arm $e^5$ of the frame, and its lower end being swiveled or otherwise connected with the frame at 5, and the screw rod $e^4$ having its bearings in the frame, and having a worm which engages a rack bar supporting the grain wheel, or secured to its bearing.

Any other kind of adjusting devices may be used in lieu of these herein described for bodily adjusting the parts, without departing from this invention. This vertical adjustment operates in conjunction with the tilting adjustment above referred to for by their conjunctive use the cutter may be raised and lowered and at the same time the parts tilted so as to bring the front ends of the gathering arms, and feeding devices nearer to or farther from the ground.

I claim—

1. In a corn harvester, reciprocating feeding jaws, moving toward each other to grip the corn, and rearwardly to present it to the cutter.

2. In a corn harvester, two or more pairs of successively acting feeding jaws, arranged with their acting edges facing each other, the jaws of each pair moving toward each other to grip the corn, and moving rearwardly to feed the corn along.

3. In a corn harvester, two or more pairs of four-motion feeding jaws, arranged with their acting edges facing each other, and acting successively to grip and feed along the corn.

4. In a corn harvester, a continuous upper or stalk feeding device, and a lower or butt-feeding device comprising reciprocating feeding jaws, arranged with their acting edges facing each other, adapted to grip and feed along the corn.

5. In a corn harvester, a continuous upper or stalk feeding device, and a lower or butt-feeding device consisting of two pairs of successively acting feeding jaws or plates, arranged with their acting edges facing each other, and adapted to successively grip and feed along the corn.

6. In a corn harvester, a continuous upper feeding device composed of a pair of continuously moving chains and a butt-feeding device consisting of a plurality of four-motion reciprocating jaws, arranged to approach and recede from each other to grip and feed along the corn.

7. In a corn harvester, a butt-feeding device comprising a pair of four-motion feeding jaws moving at a speed corresponding to the speed of the machine, and arranged to approach and recede from each other to grip and feed along the corn, combined with a pair of stalk-feeding chains moving at a faster speed than the butt-feeding jaws, substantially as described.

8. In a corn harvester, reciprocating feeding jaws moving toward each other to grasp the corn, and rearward to present it to the cutter, and deliver it to the binder.

In testimony whereof I have signed my name to this specification in the presence of two subscribing witnesses.

CHARLES S. SHARP.

Witnesses:
 Jos. J. Glass,
 E. D. Heffron.